Figure 1:
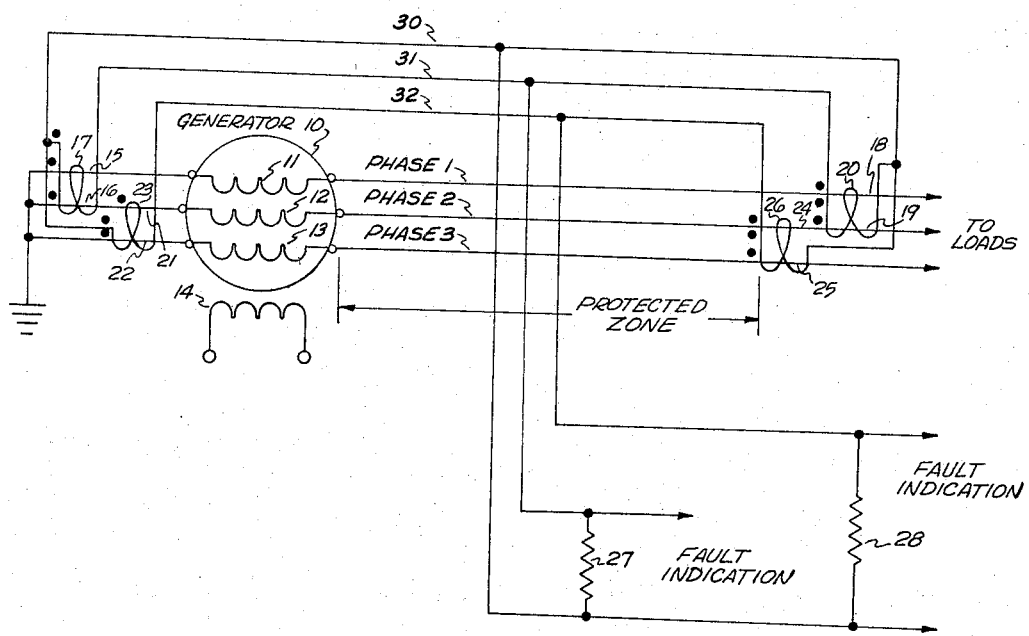

April 9, 1968        W. A. LE DOUX        3,377,551

MULTIPHASE CURRENT TRANSFORMER FAULT INDICATOR

Filed June 26, 1964

INVENTOR.
WILLIAM A. LEDOUX
BY James J. Williams
HIS ATTORNEY

United States Patent Office 3,377,551
Patented Apr. 9, 1968

3,377,551
MULTIPHASE CURRENT TRANSFORMER
FAULT INDICATOR
William A. Le Doux, Afton, Va., assignor to General Electric Company, a corporation of New York
Filed June 26, 1964, Ser. No. 378,336
5 Claims. (Cl. 324—51)

The invention relates to a multiphase fault indicator, and particularly to a multiphase fault indicator that uses current transformers.

Known multiphase fault indicators utilize current transformers coupled to each phase of an alternating current system at points between which faults in the system are to be indicated. Indications of a fault can be used for information or for automatic corrective action. Examples of such fault indicators are shown on pages 195 through 200 of "Automatic Protection Of A.C. Circuits" by G. W. Stubbings, fourth edition, 1954, Chapman & Hall Ltd., London. As shown in these examples, a current transformer is required for each phase and at each of the points between which faults are to be indicated.

Accordingly, an object of the invention is to provide an improved multiphase fault indicator.

Another object of the invention is to provide a novel multiphase fault indicator which requires fewer current transformers than required by known multiphase fault indicators.

Another object of the invention is to provide a multiphase fault indicator which uses current transformers coupled to the phases at the points between which faults are to be indicated, with each phase forming a primary winding so that any fault between the points causes a current in a secondary winding that is not counterbalanced by currents in other secondary windings at either of the points.

In a multiphase alternating current system, these and other objects are achieved in accordance with the invention by a single secondary winding of one current transformer coupled to at least two phases of the system at one point, and by a single secondary winding of a second transformer coupled to the same phases at a second point. The two secondary windings are coupled together with a burden resistor so that their respective currents are compared. Additional current transformers are similarly coupled to the system until all phases are coupled to at least one current transformer. Any fault in the phases between the points causes a differential current flow through at least one of the burden resistors. This differential current flow can provide an indication. Or, current transformers can be provided at only one point with the secondary windings coupled to a reference circuit. Currents which exceed a magnitude set by the reference circuit can provide an indication. Since one secondary winding is responsive to currents in two or more phases, faults between two points or overcurrents in a multiphase system can be indicated by less secondary windings at each point or at one point than previously possible.

Figure 2:
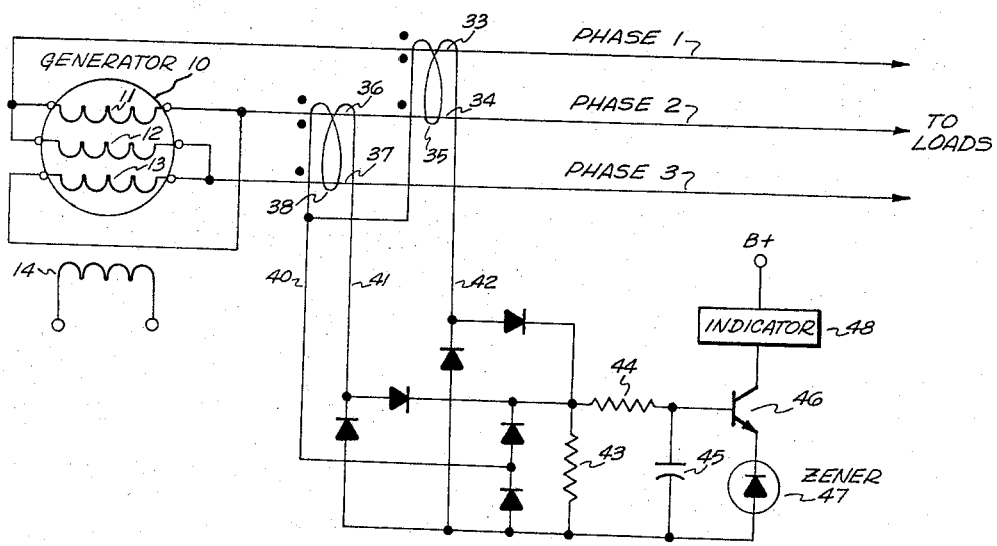

The invention is particularly pointed out in the claims. The invention may be better understood from the following description given in connection with the accompanying drawing, in which:

FIGURE 1 shows a circuit diagram of one embodiment of the invention for indicating faults between two points of an alternating current system under any load condition; and FIGURE 2 shows a circuit diagram of another embodiment of the invention for indicating overcurrents beyond a point on an alternating current system.

FIGURE 1 shows an embodiment of the invention for indicating faults on an alternating current system between some distant point. As an example, the alternating current system is assumed to be a three phase system although the invention may be applied to other systems consisting of more than three phases. The system shown is supplied by generator stator windings 11, 12, 13. These windings 11, 12, 13 are excited by a field winding 14 which is connected to a suitable source and which is usually the rotating winding of the generator 10. The stator windings 11, 12, 13 of the generator 10 are Y-connected with one end of each of the three windings 11, 12, 13 coupled together and coupled to a point of reference potential such as ground. The other ends of the three windings 11, 12, 13 are coupled to the load.

The current transformers used in accordance with the invention are known in the art. Such current transformers usually comprise a primary winding which may be a single lead or bus which carries the primary current, and to which the secondary winding is coupled. The impedance transformation between the primary and secondary windings may be such that the secondary current is one-hundredth of the primary current. In accordance with the invention, each of the current transformers has two primary windings which are respectively coupled in series with two phases, and which has a single secondary winding coupled to both primary windings. Each secondary winding thus provides a resultant current indicative of the currents in its two primary windings. In FIGURE 1, a primary winding 15 and a primary winding 16 of a current transformer are respectively coupled in series with phases 1 and 2 between the generator windings 11, 12 and ground. A secondary winding 17 is coupled to or associated with the two primary windings 15, 16 as indicated by the dots. Thus, a positive or negative voltage at a dotted end of any one winding causes a positive or negative voltage respectively at the dotted end of the other windings. In a similar manner, primary windings 18, 19 are coupled in series with phases 1 and 2 at or near the load. The part of the phases between the points at which the primary windings are connected is the protected zone. A secondary winding 20 is coupled to or associated with the primary windings 18, 19 as indicated by the dots. The secondary winding 20 is coupled to the secondary winding 17 by a common lead 30 and a first lead 31 in such a manner that currents in phase 1 and phase 2 cause resultant currents in the secondary windings 17, 20 which are adding or aiding. In a similar manner, the primary windings 21, 22 are coupled in series with phases 2 and 3 on the ground side of the generator windings 12, 13. Their associated secondary winding 23 is coupled to these primary windings 21, 22 as indicated by the dots. The primary windings 24, 25 are coupled to phases 2 and 3 on the load side of the generator windings 12, 13 at or near the load. Their associated secondary winding 26 is coupled to the primary windings 24, 25 as indicated by the dots. The secondary winding 26 is coupled to the secondary winding 23 by the common lead 30 and a second lead 32 in such a manner that currents in phase 2 and phase 3 cause resultant currents in the secondary windings 23, 26 which are adding or aiding.

A fault or burden resistor 27 is coupled between the first lead 31 and the common lead 30, and a fault or burden resistor 28 is coupled between the second lead 32 and the common lead 30.

When the fault indicator is in operation, if there is no fault current in the protected zone, currents through the primary windings 15, 16 are substantially the same as currents through the primary windings 18, 19 respectively, and currents through the primary windings 21, 22 are substantially the same as currents in the primary windings 24, 25 respectively. The resultant current provided by the secondary winding 17 has substantially the same phase and magnitude as the resultant current provided by the secondary winding 20. Therefore, there is no current flow through the burden resistor 27. This may be explained in two ways. First, it can be assumed that there is a single circulating current in the common lead 30, the secondary winding 20, the first lead 31, and the secondary winding 17. Or second, it can be assumed that there is a first current through the secondary winding 17, the common lead 30, in a given direction in the burden resistor 27, and the first lead 31. And, there is a second current (equal to the first current) in the opposite direction through the burden resistor 27, and through the leads 30, 31 and the secondary winding 20. In either case, there is no measurable current flow through the burden resistor 27. Likewise, there is no measurable current through the burden resistor 28. This is because the current through each of the phases is the same at both points on each of the respective phases.

If a fault develops in the protected zone, there will be some added current through the fault, whether this fault is between two or more of the phases or between any or more of the phases and ground. This fault current causes an increase in the current provided by the secondary winding or windings 17, 23 associated with the faulted phase or phases. But since this fault current does not flow to the load, it has no effect on the secondary windings 20, 26. Therefore, this added fault current reflected into the secondary windings 17, 23 must flow through the associated burden resistor or resistors 27, 28. As soon as this current flow occurs, a voltage is developed across one of the burden resistors 27, 28 and a fault indication is given. This indication can be used for information or can cause operation of some device such as an alarm, a light, or a protective relay. Thus, if the currents provided by the secondary windings 17, 20 are substantially equal in magnitude, and if the currents provided by the secondary windings 23, 26 are substantially equal in magnitude, no fault indication is given. The secondary windings 17, 20 effectively compare currents in both of their respective primary windings 15, 16, 18, 19, and as long as these currents are substantially the same, no fault is indicated. The secondary windings 23, 26 effectively compare currents in both of their respective primary windings 21, 22, 24, 25, and as long as these currents are substantially the same, no fault is indicated. However, if a fault develops, added secondary current flows through one or both of the secondary windings 17, 23. This added current must flow through one or both of the burden resistors 27, 28 and thereby provide a fault indication.

For a three phase system, only two secondary windings are needed at each of the points between which the system is to have faults indicated. For a six phase system, only four secondary windings are needed at each of the points between which the system is to have faults indicated, because a six phase system can be considered a pair of three phase systems. This reduction in secondary windings over known prior art systems provides a cost and weight saving that is particularly desirable in systems on aircraft for example.

FIGURE 2 shows another embodiment of the invention where the fault indicator is utilized to indicate currents which exceed a predetermined reference. In FIGURE 2, the stator windings 11, 12, 13 of the generator 10 are delta-connected to supply a three phase, normally balanced load. As in FIGURE 1, two current transformers are provided for the three phases. One current transformer has primary windings 33, 34 serially connected to phases 1 and 2 and a secondary winding 35 coupled to the primary windings 33, 34. The second current transformer has primary windings 36, 37 serially connected to phases 2 and 3 and a secondary winding 38 coupled to the primary windings 36, 37. A common lead 40 is coupled to one side of both secondary windings 35, 38 and first and second leads 41, 42 are respectively coupled to the other side of the secondary windings 38, 35. These leads 40, 41, 42 are connected to an arrangement of six diode rectifiers which are coupled to provide full wave rectification. Only six rectifiers are needed, since the two rectifiers associated with the common lead 40 serve for both secondary windings. The rectified output is produced across a resistor 43 and filtered by a filter resistor 44 and a capacitor 45. The filtered output appears across the capacitor 45 and is applied to a reference circuit directly at the base of an NPN type transistor 46 and through a Zener diode 47 at the emitter of the transistor 46. The collector is coupled to a source of direct current potential B+ through an indicator 48.

The circuit of FIGURE 2, and particularly the Zener diode 47 and the resistor 43, is designed so that for an acceptable current flow through phases 1, 2, and 3, the transistor 46 does not conduct. Thus, currents in the secondary windings 35, 38 (or voltages indicative of these currents) are compared in the reference circuit against a reference voltage. Until these currents reach a sufficient magnitude, no indication is provided. However, if a fault develops on phases 1, 2, or 3, or if a load fault occurs, an appropriate one of the secondary windings 35, 38 produces an increased current with the result that the voltage across the resistor 43 increases. When this voltage reaches a sufficient magnitude, the transistor 46 conducts. When the transistor 46 conducts, current flow through the indicator 48 provides a suitable indication. Or, this current flow may be utilized to operate automatic protective apparatus such as a protective relay.

Thus, the fault indicator of FIGURE 2 needs only two secondary windings for a three phase system, or only four secondary windings for a six phase system. The currents in these windings are compared against a fixed reference rather than a variable reference such as the second set of current transformers as in FIGURE 1.

It will thus be seen that the invention provides a novel multiphase fault indicator which utilizes less current transformer secondary windings than prior art systems. Specifically, the fault indicator in accordance with the invention utilizes two current transformers at each point in a three phase system where indication or protection is desired, or four current transformers at each point in a six phase system where protection is desired. While the invention has been shown in only two embodiments, other arrangements can be made. For example, other types of generator systems, other types of connections, and other numbers of phases can be protected in accordance with the invention. In FIGURE 1, the secondary windings can be connected by separate leads instead of the common lead 30. In FIGURE 2, separate resistors and reference circuits can be provided, particularly if an unbalanced load is being used. Therefore, while the invention has been described with reference to particular embodiments, it is to be understood that modifications may be made without departing from the spirit of the invention or from the scope of the claims.

What I claim as new and desire to secure by Letters Patent of the United States is:

1. A line to line and line to neutral fault detector for a multiphase system, comprising
    a plurality of current transformers,
    a different pair of system phase lines serving as the primary windings for each transformer, such that one phase line of each of said pairs serves as a primary winding for only one of said transformers and the other phase line of each of said pairs serves as a common primary winding for two of said transformers, each of said transformers having a secondary winding, a reference circuit, and means coupling said secondary windings to said reference circuit to provide an indication of a fault in response to current in said secondary windings that exceeds a magnitude determined by said reference circuit.

2. A line to line and line to neutral fault detector for a multiphase system, comprising a plurality of current transformers, a different pair of system phase lines serving as the primary windings for each transformer, such that one phase line of each of said pairs serves as a primary winding for only one of said transformers and the other phase line of each of said pairs serves as a common primary winding for two of said transformers, each of said transformers having a secondary winding, a plurality of reference circuits, and means coupling each secondary winding to a respective one of said reference circuits to provide an indication of a fault in response to current in said secondary windings that exceeds a magnitude determined by said reference circuits.

3. A fault indicator for detecting line to line and line to neutral faults between two spaced-apart points on the lines of a multiphase system, comprising first and second groups of current transformers, each transformer in said second group corresponding to one transformer in said first group, a different pair of system phase lines serving as the primary windings for each transformer in said first group and the corresponding transformer in said second group, such that one phase line of each of said pairs serves as a primary winding for only one transformer in said first group and the corresponding transformer in said second group, and the other phase line of each of said pairs serves as a common primary winding for two transformers in said first group and the corresponding two transformers in said second group, each of said transformers having a secondary winding, the secondary winding of each transformer in said first group being coupled to the secondary winding of the corresponding transformer in said second group, and detector means coupled to the intercoupled secondary windings to detect a difference in the magnitudes of the currents generated by each secondary winding.

4. A fault indicator for a three phase system, comprising two first current transformers each having two primary windings and a secondary winding; means coupling said primary windings of each of said first current transformers in series with a respective pair of said phases at a predetermined point thereon; two second current transformers each having two primary windings and a secondary winding; means coupling said primary windings of each of said second current transformers in series with a respective pair of said phases at a second predetermined point thereon; means respectively coupling each secondary winding of said first current transformers to a secondary winding of said second current transformers, said coupled secondary windings having corresponding pairs of phases and having aiding currents; and means respectively coupled to said coupled secondary windings to indicate a difference between the magnitudes of currents in said coupled secondary windings.

5. A fault indicator for a three phase alternating current system comprising first and second current transformers each having two primary windings and a secondary winding; means coupling said primary windings of said first current transformer in series with a first phase and a second phase of said system at a first predetermined point thereon; means coupling said primary windings of said second current transformer in series with said second phase and a third phase of said system at said first predetermined point thereon; third and fourth current transformers each having two primary windings and a secondary winding; means coupling said primary windings of said third current transformer in series with said first and second phases of said system at a second predetermined point thereon; means coupling said primary windings of said fourth current transformer in series with said second and third phases of said system at said second predetermined point thereon; circuit means coupling said secondary windings of said first and third current transformers so that currents therein are aiding; circuit means coupling said secondary windings of said second and fourth current transformers so that currents therein are aiding; and means coupled to said circuit coupling means to indicate a difference in current magnitudes in said secondary windings of said first and third current transformers and to indicate a difference in current magnitudes in said secondary windings of said second and fourth transformers.

References Cited

UNITED STATES PATENTS

| 2,238,570 | 4/1941 | Schweitzer | 317—27 |
| 2,240,677 | 5/1941 | Sonnemann et al. | 317—27 |
| 3,024,451 | 3/1962 | Potter | 317—27 X |
| 3,187,225 | 6/1965 | Mayer | 317—27 X |

FOREIGN PATENTS 423,691   2/1935   Great Britain.

OTHER REFERENCES

Stubbings, "Automatic Protection of AC Circuits," 4th ed., 1954, Chapman & Hall Ltd., pp. 195–200.

RUDOLPH V. ROLINEC, *Primary Examiner.*

WALTER L. CARLSON, *Examiner.*

G. R. STRECKER, *Assistant Examiner.*